UNITED STATES PATENT OFFICE.

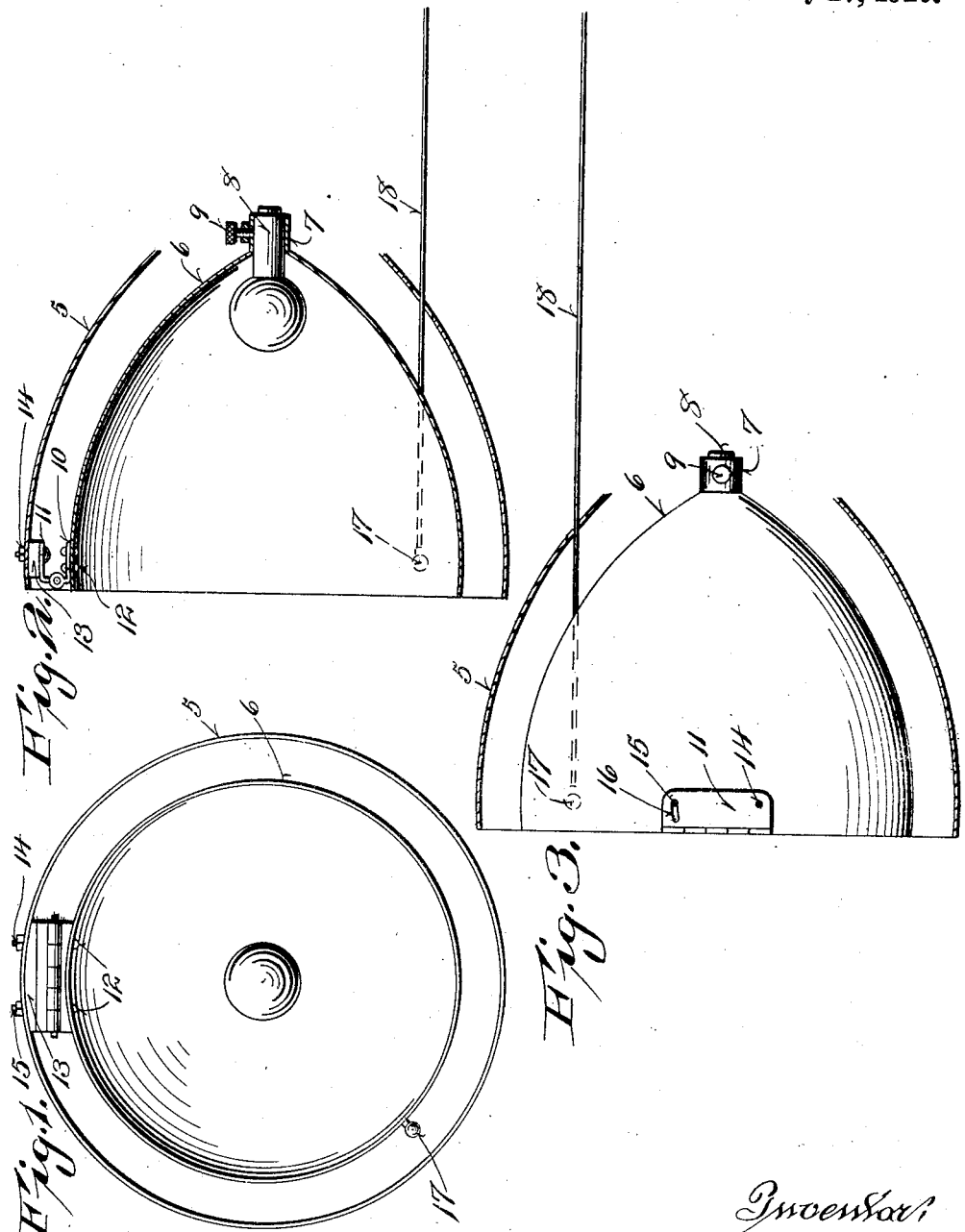

ELMER E. DRUMM, OF MANITOWOC, WISCONSIN.

HEADLIGHT-ADJUSTING DEVICE.

1,347,537.   Specification of Letters Patent.   Patented July 27, 1920.

Application filed July 15, 1919. Serial No. 311,020.

*To all whom it may concern:*

Be it known that I, ELMER E. DRUMM, a citizen of the United States, and resident of Manitowoc, in the county of Manitowoc and State of Wisconsin, have invented certain new and useful Improvements in Headlight-Adjusting Devices; and I do hereby declare that the following is a full, clear, and exact description thereof.

My invention relates to new and useful improvements in headlights of the type employed on automobiles or other vehicles, and is more particularly directed to the provision of means for adjusting the angularity of direction of a headlight with respect to the path of the vehicle on which it is carried. It is the object of my invention to provide a simple and durable headlight structure which may be mounted in the ordinary headlight brackets of an automobile or the like and which may be actuated to direct the rays of the headlight downwardly to avoid the confusing glare usually encountered upon the approach of two vehicles toward each other, and to more clearly illuminate the ground directly in front of the vehicle so that proper clearance and other conditions may be observed upon movement of two vehicles past each other.

It is more particularly my object in this latter connection to provide an arrangement for adjusting the headlight whereby its rays are directed downwardly and laterally of the path of travel of the vehicle.

With the above and other objects and advantages in view, which will be apparent as the description proceeds, my invention resides in the novel features of construction, combination and arrangement of the parts as hereinafter described and defined by the appended claims.

In the accompanying drawings:

Figure 1 is a front elevational view of a headlight structure embodying my invention.

Fig. 2 is a sectional view taken longitudinally therethrough, and

Fig. 3 is a view showing the reflector in plan, and the outer casing broken away.

Referring now more particularly to the accompanying drawings, 5 designates the outer casing or shell of a headlight structure embodying my invention and inasmuch as this shell may be of any nature to provide an adequate housing for the reflector and to permit the reflector to be moved therein to effect its various positions of adjustment, this shell is not shown in detail, being of a general cup shape and inclosed at its ends by any suitable means (not shown).

A cup shaped reflector 6 is disposed within the shell, and terminates at its rear portion in a rearwardly extending sleeve 7 in which is slidably mounted a bulb carrying member 8, this member being adjustably held in the sleeve by a set screw 9 threaded in the sleeve and engaging said member, thus, a proper focus for the bulb may be procured and maintained in the various adjusted positions of the reflector.

The reflector is connected with the casing 5, preferably at its forward top portion by a hinge having a pair of upper and lower angular wings 10 and 11 respectively, the lower wing being secured by rivets 12 to the top of the reflector 6 while the upper wing 11 of the hinge is slidably engaged against a block 13 mounted on the under face of the forward top portion of the casing. A pair of bolts 14 and 15 are passed through the casing 5, through the block and through the wing 11 of the hinge, the bolt 14 being engaged in a pivot aperture of the hinge wing 11, while the bolt 15 passes through a transverse slot 16 in the wing. The lower forward portion of the reflector carries an outward projection 17 at its side preferably adjacent the hinge slot 16, and this projection is connected with an actuating link 18 which is passed through the casing 5 and extended to a suitable point of manipulation, which may be on the dashboard of a vehicle (not shown) in the usual manner.

Thus rearward movement of the link 18 will cause the reflector 6 to be swung upwardly and rearwardly on its hinge, thus tilting the rays of light downwardly and avoiding blinding glare to which the driver of an oncoming vehicle would be subjected in the normal horizontal projection of the light rays. At the same time the roadway in front of the vehicle would be more highly illuminated to facilitate judgment of clearance distance. Simultaneously with the tilting action described, the reflector and the entire hinge would be swung horizontally, on the bolt 14 as a pivot to also direct the rays somewhat to one side of the vehicle, the degree of said horizontal tilting movement being determined by the length of the slot 16 of the hinge wing 11.

I have thus provided an exceedingly simple and efficient structure wherein the reflector unit may be tilted to procure a most advantageous direction of the light rays upon the mutual approach of two vehicles or upon travel under congested conditions.

It is obvious that the various pivot connections effected by the hinge of the bolt 14 may be varied without changing my desired operation of the reflector and other changes and modifications of structure may be employed to meet differing conditions of use and manufacture without departing in any manner from the spirit of my invention.

What is claimed is:

1. A headlight structure comprising a support member, a reflector member, a pair of hinge connected parts, one of said parts being secured to one of said members and the other part being pivotally connected with the other member for movement in a plane at right angles to the plane of hinge movement of said hinge connected parts and means connected with the reflector member for swinging said reflector member.

2. A headlight structure comprising a support, a reflector, a hinge having one of its wings secured to the reflector, a pivotal connection between the other wing of the hinge and the support and means for swinging the reflector on said hinge and pivot.

3. A headlight structure comprising a cup-shaped casing, a cup-shaped reflector nested within and spaced from the walls of said casing, a hinge having one of its wings secured to the reflector adjacent to its outer edge, a pivot connection between the other wing of the hinge and the casing, and means for swinging the reflector on said hinge and pivot.

In testimony that I claim the foregoing I have hereunto set my hand at Manitowoc, in the county of Manitowoc and State of Wisconsin.

ELMER E. DRUMM.